March 22, 1960  MINEJIRO JIN  2,929,483
DRIVING DEVICE OF MOVABLE HANDRAILS FOR ESCALATOR
Filed May 25, 1959
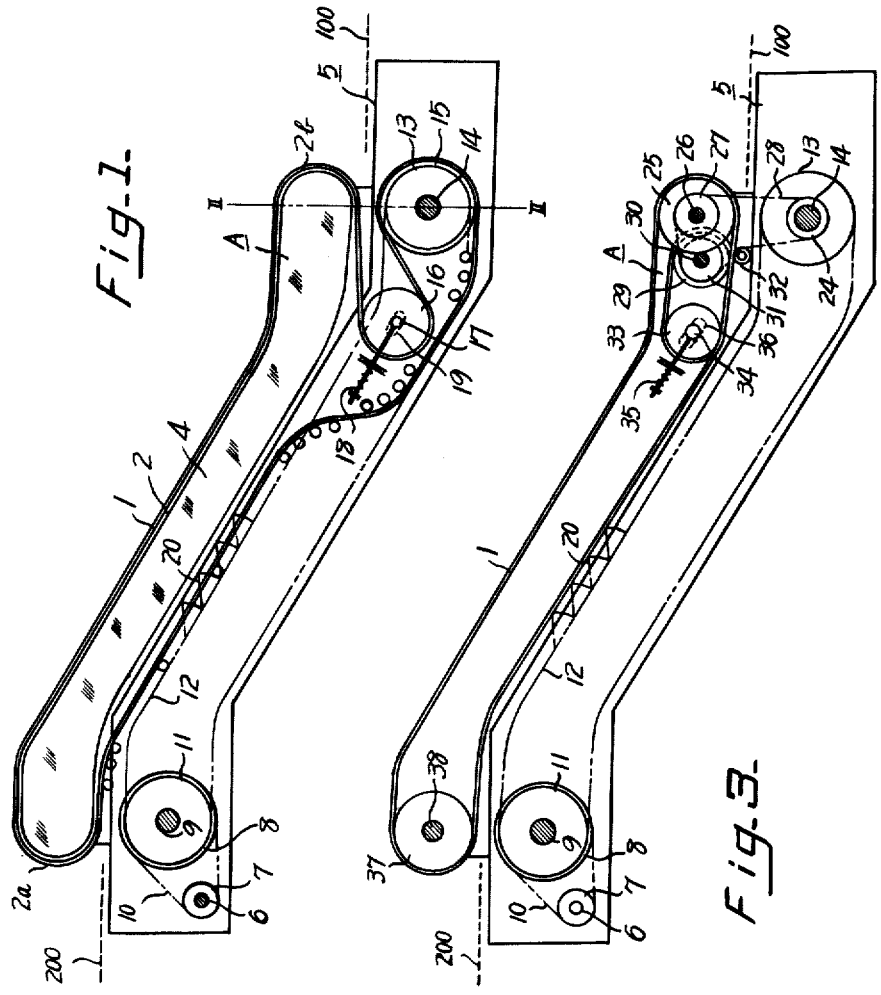
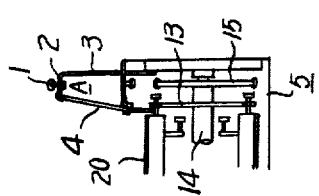

United States Patent Office 2,929,483
Patented Mar. 22, 1960

2,929,483

DRIVING DEVICE OF MOVABLE HANDRAILS FOR ESCALATOR

Minejiro Jin, Hitachi City, Japan, assignor to Hitachi Limited, Tokyo, Japan

Application May 25, 1959, Serial No. 815,400

3 Claims. (Cl. 198—16)

This invention relates to devices for driving movable handrails adapted for use with escalators provided with full transparent ledger boards.

An object of this invention is to provide a driving device for the movable handrails of an escalator having full transparent ledger boards of the latest type.

The invention will next be explained with reference to the accompanying drawing, in which:

Fig. 1 is a diagrammatic side elevational view illustrating a driving device for movable handrails as provided in accordance with this invention;

Fig. 2 is a sectional view taken on line II—II of Fig. 1, and

Fig. 3 is a diagrammatic side elevational view of a conventional driving device shown for the purpose of comparison.

Referring to Fig. 3, 1 designates the endless movable handrails of an escalator, A represents a balustrade, 5 is a supporting frame consisting of a steel structure, 6 represents a driving shaft, 7 a driving sprocket wheel, 8 a driven sprocket wheel fixed to the shaft 9, 10 a driving chain, 11 is an upper sprocket wheel fixed to shaft 9 for driving step plates 20 through an endless chain 12. 13 represents a lower sprocket wheel fixed to the shaft 14 for driving the step plates 20, and 24 represents another sprocket wheel secured to shaft 14. 25 represents a guide wheel arranged in the interior of the ledger board for guiding the lower end of the movable handrails, and 26 is its shaft, 27 a sprocket wheel secured to the shaft 26, 28 represents a driving chain, 29 is a guide pulley fixed to the shaft 30 for guiding the lower part of the movable handrails, and 31 is a sprocket wheel secured to shaft 30, and 32 is a small sprocket wheel. 33 represents a tensioning pulley of the handrail, 34 is its shaft, 35 a tightening spring and 36 a guide groove for the axle 34. 37 represents an upper guide pulley secured to the shaft 38 for guiding the movable handrails. 100 designates the floor surface of the lower stage and 200 represents the floor surface of the upper stage.

Each of step plates 20 is connected to the endless chain 12 which is passed around the upper sprocket wheel 11 and the lower sprocket wheel 13 for driving step plates arranged in the upper and lower part respectively in the supporting frame structure 5 and these are driven by means of the sprocket wheel 7, chain 10 and sprocket wheel 8 when the driving shaft 6 is turned, thereby revolving the upper sprocket wheel 11 and the step plates 20 connected to the chain 12 are shifted by sliding on the guide rails arranged in the supporting frame structure 5 as is well known. As the endless movable handrails 1 must move at the same speed as the step plates 20 the handrails 1 are driven by the guide pulley 25 fixed to the shaft 26 as shown in Fig. 3, by means of the sprocket wheel 24 secured to shaft 14 of the lower sprocket wheel 13, chain 28, chain wheel 27 secured to the shaft 26, the sprocket wheel 31 secured to the shaft 30 and the guide sprocket wheel 32. In order to prevent slip of the handrails 1 on the guide pulley 25, provision is made of a device for taking up the slack of the handrails consisting of a guide pulley 29 and the tensioning pulley 33, and a part of the endless handrails 1 passing over and around the upper and lower guide pulleys 37 and 25 and forming a large loop is passed over and around the guide pulley 29 and 33 of the slack compensating device forming a smaller loop. The axle 34 of the tensioning pulley 33 is arranged to be movable in the guide grooves 36 to regulate the tightness of the handrails.

As apparent from Fig. 3, in the heretofore used movable handrail driving device, the upper and lower guide pulleys 37 and 25, the guide pulley 29 and tensioning pulley 33 of the slack compensating device and the other accessories are enclosed in the interior of the balustrade A and, in order to prevent the above parts arranged inside the balustrade A from being seen, the outside of the balustrade A is covered by translucent side plates.

On the other hand, in the most recent types of escalators, the balustrade A is so constructed that the outside side boards are dispensed with and a transparent balustrade consisting of supporting columns and transparent inside side boards are used. Accordingly the arrangement whereby the movable handrail driving device encloses the slack compensating device consisting of tensioning pulley 33 and guide pulley 29 has now become undesirable.

The present invention is intended to obviate the above disadvantages and an embodiment of this invention is illustrated in Figs. 1 and 2.

Referring to Figs. 1 and 2, reference numeral 1 designates endless movable handrails, 2 is its supporting structure and 3 is a supporting column for the structure 2 and 4 is a transparent side board on each side of step plates 20 of the balustrade A. 5 represents a supporting frame consisting of a steel structure. 6 represents a driving shaft which is driven by an electric motor (not shown). 7 represents a driving sprocket wheel, 8 a driven sprocket wheel secured to the shaft 9 and 10 is a chain, 11 is an upper sprocket wheel secured to the shaft 9, and 12 represents an endless chain for the step plates. 13 represents a lower sprocket wheel fixed to the shaft 14 which has secured thereto a pulley 15 for driving the handrails. 16 represents a tensioning pulley for the handrails secured to the shaft 17. 18 represents a tightening spring put around a spindle connected to the axle of the shaft 17 which may slide in the guide grooves 19.

In Figs. 1 and 2, the endless chain 12 having step plates 20 connected thereto is passed over and around the upper sprocket wheel 11 and lower sprocket wheel 13 and is driven by the rotation of the upper sprocket wheel 11 which is driven by the sprocket wheel 7 and chain 10. Sprocket wheel 8 is similar to the known device illustrated in reference to Fig. 3, but the present invention otherwise a great improvement.

In accordance with this invention, guide pulleys 27, 25 and 29 and tensioning pulley 33 constituting the slack compensating device of the handrails shown in Fig. 3 have been dispensed with and the movable handrails 1 are positioned on the handrail supporting member 2 and the curved portions 2a and 2b of the rails are guided thereby. The driving pulley 15 and tensioning pulley 16 are arranged in the interior of the supporting frame structure 5, while the driving pulley 15 is rigidly secured to the shaft 14 of the sprocket wheel 13, around which the driving chain 12 is passed so as to turn the sprocket whdeel 13 and the driving pulley 15 at the same speeds. The handrails 1 are turned around the rounded end 2b of the handrail supporting member and are passed around the tensioning pulley 16 from its upper periphery counterclockwise and then from the lower part of the pulley 16 are led to the upper periphery of the pulley 15 and around it in the shape of an S and then are passed beneath the pulley 16. The handrails are then passed around the curved portion 2a of the handrail supporting metallic member so that the bent-over portions of the handrails can pass through the same vertical plane.

According to this invention, the interior of the balustrade A is thus entirely vacant so that transparent side boards 4 may be extended over the total length from the lower stage to the upper stage to form an entirely transparent balustrade. For driving the handrails 1, the inner space of the supporting frame structure 5 can be effectively utilized for arranging the handrail driving device and the driving pulley 15 and the tension pulley 16 of larger diameter can easily be installed therein. A larger bend angle is obtained by the pulley of larger diameter and moreover the turned back portion of the handrails 1 can pass through the same vertical plane so that the handrails can be driven smoothly and positively and vibration due to a small bending radius and undue twist are not given to the handrails and vibration and short life can thus be avoided.

What is claimed is:

1. An escalator structure comprising an inclined transparent balustrade including a rail guide portion, an endless handrail slidably supported on said guide portion, connected step plates adapted for being driven along the bottom of said balustrade, a frame beneath and supporting the balustrade, sprockets spaced at opposite ends of the balustrate and positioned within said frame, shafts supporting the sprockets, an endless chain on the sprockets and engaging the step plates for driving the same, a driving pulley on the shaft of one of the sprockets and positioned within said frame, said pulley and the nearest end of the guide portion defining curved paths for said handrail, a tensioning pulley within said frame and defining with each of said curved paths an S-shaped path, said handrail passing around the latter said end of the guide portion, around the tensioning pulley and around the driving pulley, and means for driving the sprockets and driving pulley simultaneously.

2. A structure as claimed in claim 1 wherein said curved paths have vertically aligned centers of curvature.

3. A structure as claimed in claim 1 comprising rollers for guiding the handrail tensioning pulley.

References Cited in the file of this patent
UNITED STATES PATENTS

| | | |
|---|---|---|
| 637,526 | Reno | Nov. 21, 1899 |
| 972,475 | Seeberger | Oct. 11, 1910 |